(12) United States Patent
Kitazumi et al.

(10) Patent No.: US 7,218,953 B2
(45) Date of Patent: May 15, 2007

(54) INFRARED COMMUNICATION ADAPTER

(75) Inventors: Gontaro Kitazumi, Tokyo (JP);
Takeshi Ohyama, Tokyo (JP);
Shin-ichi Nagamura, Inagi (JP)

(73) Assignee: ITX E-Globaledge Corporation, Tokyo (JP)

( * ) Notice: Subject to any disclaimer, the term of this patent is extended or adjusted under 35 U.S.C. 154(b) by 651 days.

(21) Appl. No.: 10/398,583

(22) PCT Filed: May 28, 2001

(86) PCT No.: PCT/JP01/04442

§ 371 (c)(1),
(2), (4) Date: Aug. 12, 2003

(87) PCT Pub. No.: WO02/33935

PCT Pub. Date: Apr. 25, 2002

(65) Prior Publication Data

US 2004/0029613 A1 Feb. 12, 2004

(30) Foreign Application Priority Data

Oct. 13, 2000 (JP) .............................. 2000-313997

(51) Int. Cl.
*H04B 1/38* (2006.01)

(52) U.S. Cl. .................. 455/557; 455/556.2; 455/558; 455/559; 455/556.1

(58) Field of Classification Search ................ 455/557, 455/558, 556.2, 556.1, 559
See application file for complete search history.

(56) References Cited

U.S. PATENT DOCUMENTS 5,636,264 A * 6/1997 Sulavuori et al. ............. 398/41

5,786,921 A 7/1998 Wang et al.
6,031,825 A 2/2000 Kaikuranta et al.
6,397,086 B1 * 5/2002 Chen ........................ 455/569.2

FOREIGN PATENT DOCUMENTS

DE 199 10 202 9/2000

(Continued)

OTHER PUBLICATIONS

Supplementary European Search Report dated Oct. 10, 2006 and issued in corresponding European Application No. 01932289.0.
Supplementary Partial European Search Report dated Jul. 11, 2006 and issued in corresponding European Application No. 01932289.0.

*Primary Examiner*—Joseph Feild
*Assistant Examiner*—Khai Nguyen
(74) *Attorney, Agent, or Firm*—Staas & Halsey LLP

(57) ABSTRACT

An infrared communication adapter which can carry out a data exchange with an external equipment having an infrared communication interface even though a portable telephone does not have an infrared communication function. The adapter includes a portable telephone side connecting section for transmitting a serial data supplied from the portable telephone by connecting an external communication interface of the portable telephone; an infrared communication interface for carrying out a data communication with the external equipment in accordance with the infrared communication protocol. The adapter analyzes a communication protocol of the communication interface disposed on the data supply side and carries out an RS232C emulation internally to transmit the data by converting the analyzed communication protocol into a communication protocol corresponding to a communication interface disposed on the data receive side.

5 Claims, 13 Drawing Sheets

FOREIGN PATENT DOCUMENTS

| | | |
|---|---|---|
| JP | 11-113059 | 4/1999 |
| JP | 11-252204 | 9/1999 |
| JP | 2000-32154 | 1/2000 |
| JP | 2000-032154 * | 1/2000 |
| JP | 2000-201216 | 7/2000 |
| WO | WO 97/36220 | 10/1997 |

\* cited by examiner

FIG.4A

INFRARED(IrLAP,IrLMP,TinyTP,IrCOMM)PACKET

| BOF | CA | CMD | DES LSAP | SRC LSAP | CRE DIT | CTL LEN | CTL | DATA | CRC | EOF |

P1

BOF     BEGINNING OF FRAME
CA     CONNECTION ADDRESS
CMD     COMMAND
DES LSAP     DESTINATION LSAP
SRC LSAP     SOURCE LSAP
CREDIT     CREDIT FOR FLOW CONTROL
FTL LEN     CONTROL DATA LENGTH
CTL     CONTROL DATA
DATA     USER DATA

FIG.4B

PDC(ARIB RCR STD-27 A3)PACKET

| BACK WORD CHANNEL CONTROL INFORMATION | FORWARD WORD CHANNEL CONTROL INFORMATION | STATUS FLAG | USER DATA | CRC-16 | CRC-CCITT |

SINGLE BODY OPERATION

| BUTTON PUSHING STATE | FUNCTION |
|---|---|
| ONE PUSH | TRANSMIT ELECTRONIC vCARD |
| PUSH FOR 2 SECONDS | TRANSMIT FILE |
| PUSH FOR 5 SECONDS | RECEIVE ELECTRONIC vCARD |
| DOUBLE CLICK | RECEIVE FILE |

FIG.8B

PORTABLE TELEPHONE INSERTION OPERATION

| BUTTON PUSHING STATE | FUNCTION |
|---|---|
| ONE PUSH | TRANSMIT PHONE NUMBER OF PORTABLE TELEPHONE |
| PUSH FOR 2 SECONDS | |
| PUSH FOR 5 SECONDS | REGISTER PASSWORD TO INFRARED COMMUNICATION ADAPTER |
| DOUBLE CLICK | |

IrDA PROTOCOL STACK STRUCTURE

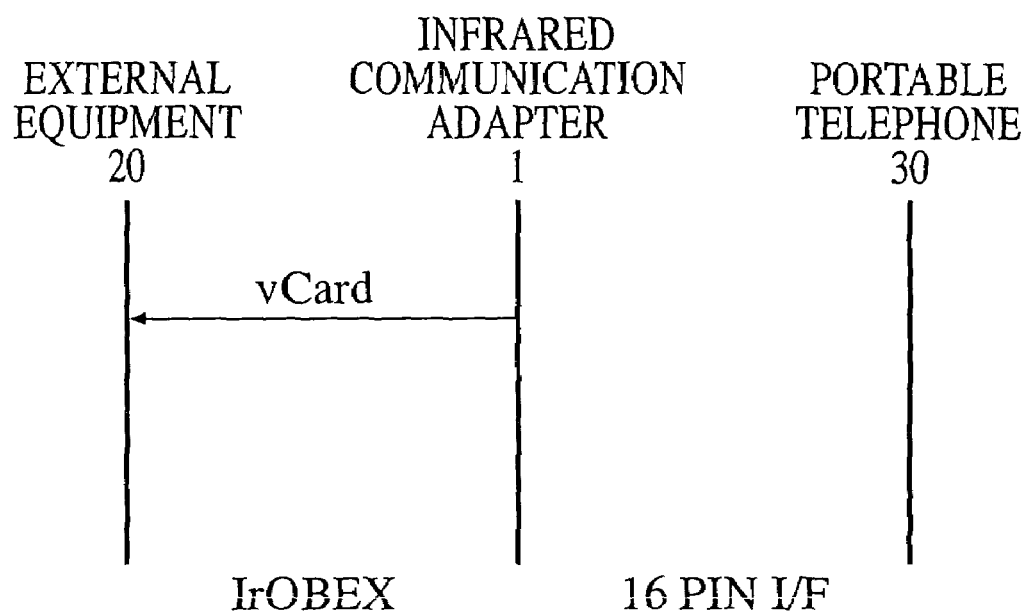
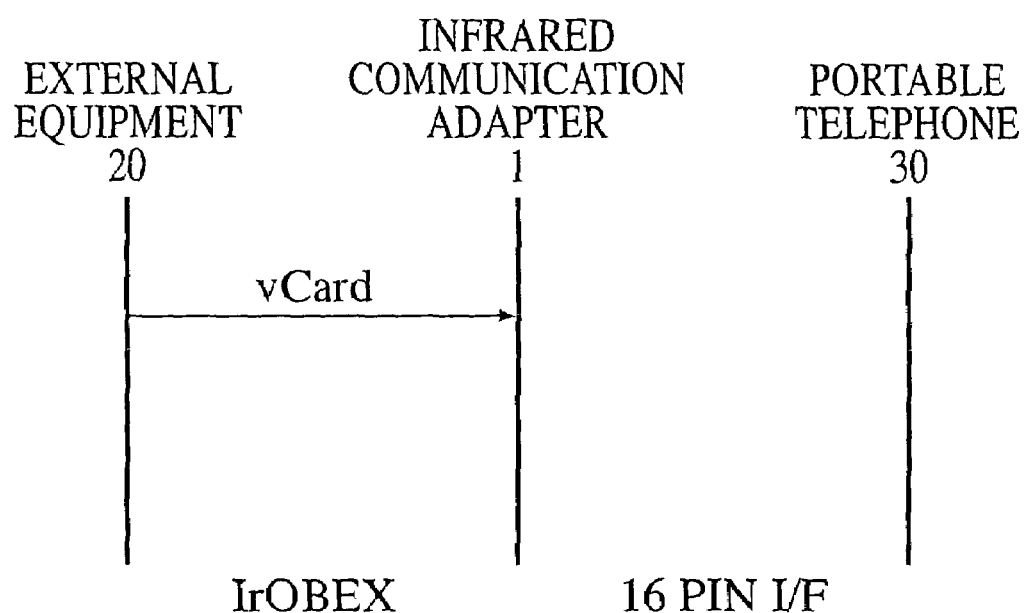

INFRARED COMMUNICATION ADAPTER

TECHNICAL FIELD

The present invention relates to an infrared communication adapter for carrying out an infrared communication with an external equipment by connecting the adapter with an external communication interface provided on a portable telephone.

BACKGROUND OF THE INVENTION

In recent years, as portable information terminals which are referred to as notebook personal computers and PDAs (Personal Digital Assistants), are spread, a wireless data communication in which an electrical or optical wire is not required, is frequently used as a data communication between information terminal devices. As a system of wireless data communication, there is a data communication using the infrared rays.

The infrared data communication system is standardized by the IrDA (Infrared Data Association). It is possible to carry out a data transmission between information terminal devices at a communication speed of about 100 kbps to 4 Mbps. Further, in recent years, the IrMC (Infrared Mobile Communications) which is an infrared communication standard for a portable telephone, the IrOBEX (IrDA Object Exchange) which is an infrared object exchange protocol, the IrDA Lite for using the infrared communication in a small device, and the like are standardized. It is possible to realize a flexible and high performance infrared communication between terminal devices.

In such a technical background, the infrared communication has been widely used to exchange data between information terminal devices. However, at present, the infrared communicating function is not necessarily provided on each portable telephone. Therefore, the data communication using the infrared rays between all of the information terminal devices, such as between a portable telephone, a personal computer and a PDA or the like, is not always carried out.

In recent years, as portable information terminals which are referred to as notebook personal computers and PDAs (Personal Digital Assistants), have become more popular, a wireless data communication in which an electrical or optical wire is not required, is frequently used as a data communication between information terminal devices. As a system of wireless data communication, there is a data communication using the infrared rays.

SUMMARY OF THE INVENTION

In order to accomplish the object, the present invention has the following features. In the explanation for the elements described below, as an example, the element corresponding to the embodiment is described by using parentheses. A reference numeral or the like indicates a drawing reference numeral or the like, which will be described below.

In accordance with the first aspect of the present invention, an infrared communication adapter, includes:

a portable telephone side communication interface (for example, a portable telephone connecting section 4 shown in FIG. 1) for carrying out a serial data transmission by connecting with an external communication interface provided in a portable telephone, in accordance with a serial data transmission protocol of the portable telephone;

an infrared communication interface (for example, an infrared communication interface 3 shown in FIG. 1) for carrying out a data communication with an external equipment having an infrared communication interface in accordance with an infrared communication protocol; and a data processing section (for example, a CPU 10 shown in FIG. 2) for carrying out a data process to transmit a data supplied from one communication interface of the communication interfaces, to the other communication interface;

wherein the data processing section includes:

a protocol conversion unit for analyzing a communication protocol of a data supplying side communication interface and for converting the analyzed communication protocol into a communication protocol corresponding to a data receiving side communication interface; and a data conversion unit for converting a serial data supplied from the portable telephone side communication interface, into a data which can be transmitted in accordance with the infrared communication protocol, to transmit the data to the infrared communication interface, and for converting a data supplied from the infrared communication interface, into a serial data which can be processed by the portable telephone, to transmit the serial data to the portable telephone side communication interface.

According to the infrared communication having the above structure, by the portable telephone side communication interface, the infrared communication interface and the data processing section, it is possible to carry out the infrared data communication with the external equipment having an infrared communication interface by attaching the infrared communication adapter, even though the portable telephone does not have an infrared communication function.

That is, in the data processing section, when a serial data is supplied from the portable telephone attached to the portable telephone side communication interface, by the protocol conversion unit and the data conversion unit of the infrared communication adapter, it is possible to analyze the serial data transmission protocol of the portable telephone and to convert the serial data into a data which can be transmitted in accordance with the infrared communication protocol, to transmit the data to the infrared communication interface. Further, when the data is supplied from the external equipment through the infrared communication interface, it is possible to analyze the infrared communication protocol and to convert the data into a serial data which can be processed by the portable telephone, to transmit the data to the portable telephone side communication interface.

In the infrared communication adapter, it is effective that the data processing section further includes:

an electronic visiting card exchanging unit for reading a call number data stored in the portable telephone, from the portable telephone connected with the portable telephone side communication interface, to transmit the call number data to the external equipment through the infrared communication interface as an electronic visiting card data, and for receiving the electronic visiting card data from the external equipment through the infrared communication interface and extracting a data which can be registered to the portable telephone connected with the portable telephone side communication interface, from the electronic visiting card data, to register the extracted data to the portable telephone.

According to the infrared communication adapter having the above structure, it is possible to easily transmit a call number of the portable telephone to the external equipment as an electronic visiting card data by the electronic visiting card exchanging unit through an infrared communication. Further, it is possible to easily register a register able data (for example, a telephone number data) included in the electronic visiting card data received from the external equipment through the infrared communication, to the portable telephone.

It is effective that the infrared communication adapter further includes a storing section (for example, a RAM 11 shown in FIG. 2) for storing a data and an operation section (for example, an operation section 5 shown in FIG. 1 and FIG. 2) for being operated by a user;

wherein the data processing section includes:

a data storing control unit (for example, a CPU 10 shown in FIG. 2, S1 to S7 shown in FIG. 12) for storing a received data when the received data is received from the external equipment through the infrared communication interface in a state that the portable telephone is not connected, and for reading a data stored in the storing section, in accordance with a predetermined operation carried out by the operation section, to transmit the read data to the external equipment through the infrared communication interface.

According to the infrared communication adapter having the above structure, because the data received from the external equipment having the infrared communication interface is stored in the storing section by using the storing section, the operation section and the data storing control unit, and the data which is stored in storing section is transmitted to the external equipment by operating the operation section, it is possible to carry out the data communication with the external equipment even though the adapter is not attached to the portable telephone.

It is effective that the infrared communication adapter further includes a storing section for storing a data and an operation section for being operated by a user;

wherein the data processing section includes:

a first judging unit (for example, a CPU 10 shown in FIG. 2, S1 shown in FIG. 12) for judging whether the portable telephone is connected or not;

a second judging unit (for example, a CPU 10 shown in FIG. 1, S3 and S9 shown in FIG. 12) for judging an operating state in accordance with an operation time or the number of operations of the operation section;

a control section for controlling the adapter so as to carry out one process selected from a first process (S4 and S7 shown in FIG. 12) for reading a data from the storing section in accordance with each judging result of the first and second judging units to transmit the read data to the external equipment through the infrared communication interface; a second process (S5 and 56 shown in FIG. 12) for receiving the transmitted data from the external equipment through the infrared communication interface to store the received data in the storing unit; a third process (S10 shown in FIG. 12) for reading a call number data registered to the connected portable telephone, to transmit the read call number data to the external equipment through the infrared communication interface as an electronic visiting card data; and a fourth process (S15 shown in FIG. 11) for receiving the electronic visiting card data for the external equipment through the infrared communication interface and extracting a data which can be registered to the portable telephone, from the electronic visiting card data, to register the extracted data to the portable telephone.

According to the infrared communication adapter having the above structure, because the data communication is controlled so as to carry out a different process by the operation section, the storing section, the first and second judging units and the control section in accordance with the connecting state of the portable telephone and the operating state of the operation section, it is possible to carry out various processes by the small number of operating elements. Further, because a complicated operation for carrying out a process is not required, it is possible to improve the operability and the convenience.

In accordance with the second aspect of the present invention, an infrared communication adapter, includes:

a portable telephone side communication interface (for example, a portable telephone connecting section 4 shown in FIG. 1) for carrying out a serial data transmission by connecting with an external communication interface provided in a portable telephone, in accordance with a serial data transmission protocol of the portable telephone;

an infrared communication interface (for example, an infrared communication interface 3 shown in FIG. 1) for carrying out a data communication with an external equipment having an infrared communication interface in accordance with an infrared communication protocol;

wherein in order to carry out plural different serial data exchanging processes between the portable telephone and the external equipment, plural serial data paths corresponding to each serial data exchanging process are virtually generated; and the infrared communication adapter includes: a detecting section (for example, a CPU 10 shown in FIG. 2) for detecting a data communication speed between the external equipment and the infrared communication adapter; and a specifying section (for example, a CPU 10 shown in FIG. 2) for specifying a serial data path to be used among the plural serial data paths in accordance with a detecting result of the detecting section.

According to the infrared communication adapter, even though plural serial data exchanging functions are provided in the infrared communication adapter for carrying out the infrared communication with the external equipment by attaching the adapter to the portable telephone, it is possible to specify a serial data path to be used in plural serial data paths which are virtually generated, by the detecting section and the specifying section in accordance with the communication speed between the infrared communication adapter and the external equipment. Therefore, it is possible to realize plural serial data exchanging functions by using one infrared communication port.

In the infrared communication adapter, the plural serial data exchanging processes may include a local serial data exchanging process between the portable telephone and the external equipment, and a modem connecting process for using a modem function provided in the portable telephone.

According to the infrared communication adapter having the above structure, even though the infrared communication port of the infrared communication adapter is only one, it is possible to provide a modem connecting function for using the local serial data exchanging function between the portable telephone and the external equipment and the modem function of the portable telephone.

BRIEF DESCRIPTION OF DRAWINGS

FIGS. 4A and 4B are views for showing an example of a structure of data (packet) received by each communication interface.

FIGS. 8A and 8B are tables for showing an example of the correlation between a button pushing state (operating state) and a function to be carried out.

FIG. 13 is a view for schematically showing the operational sequence of the vCARD transmitting process.

FIG. 14 is a view for schematically showing the operational sequence of the vCARD receiving process.

DETAILED DESCRIPTION OF THE EMBODIMENTS

Hereinafter, embodiments of the infrared communication adapter according to the present invention will be explained with reference to the drawings.

Firstly, the structure will be explained.

Figure 1:
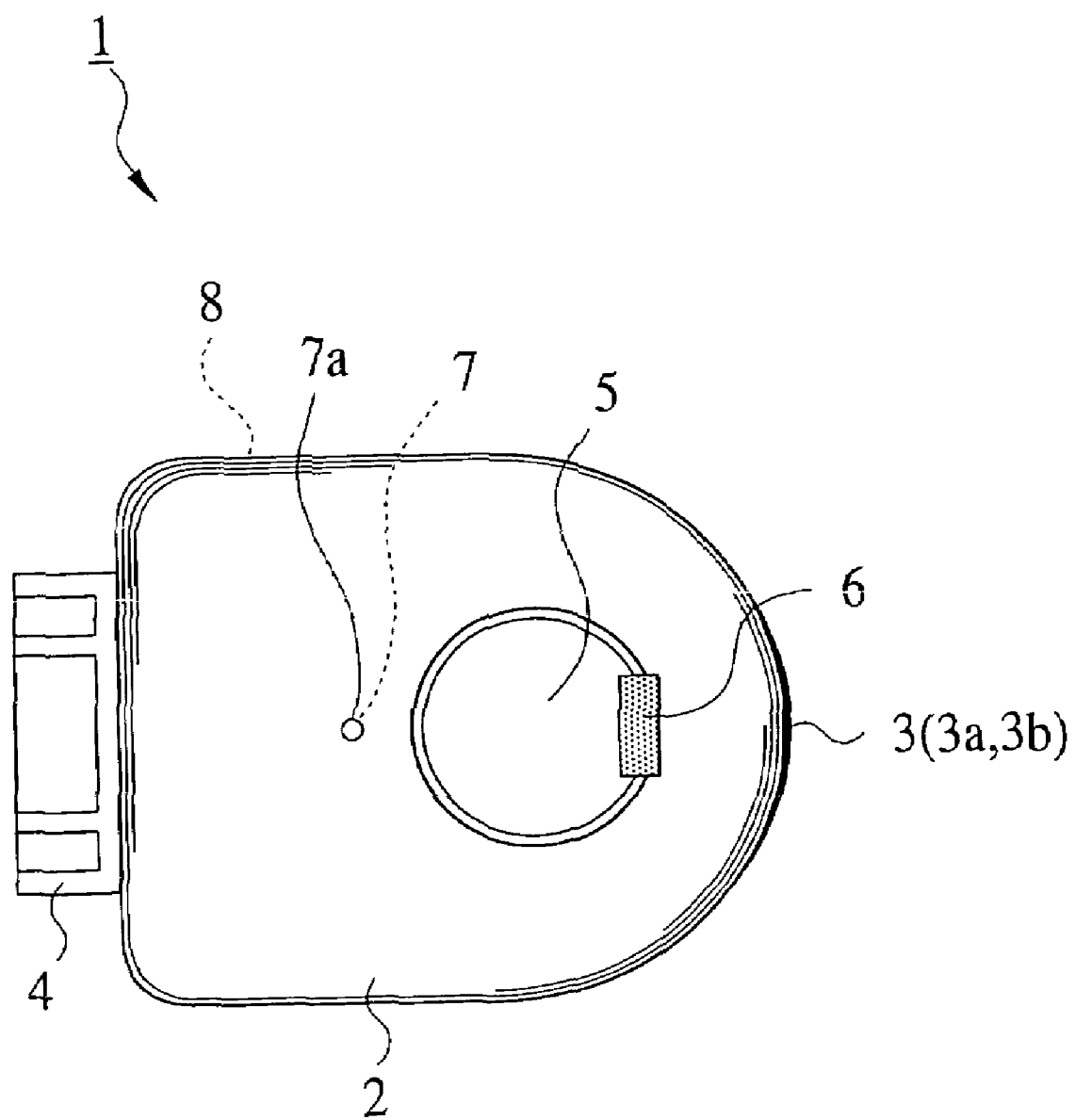
FIG. 1 is a plan view for showing an appearance of an infrared communication adapter 1 according to the present embodiment.
Figure 2:
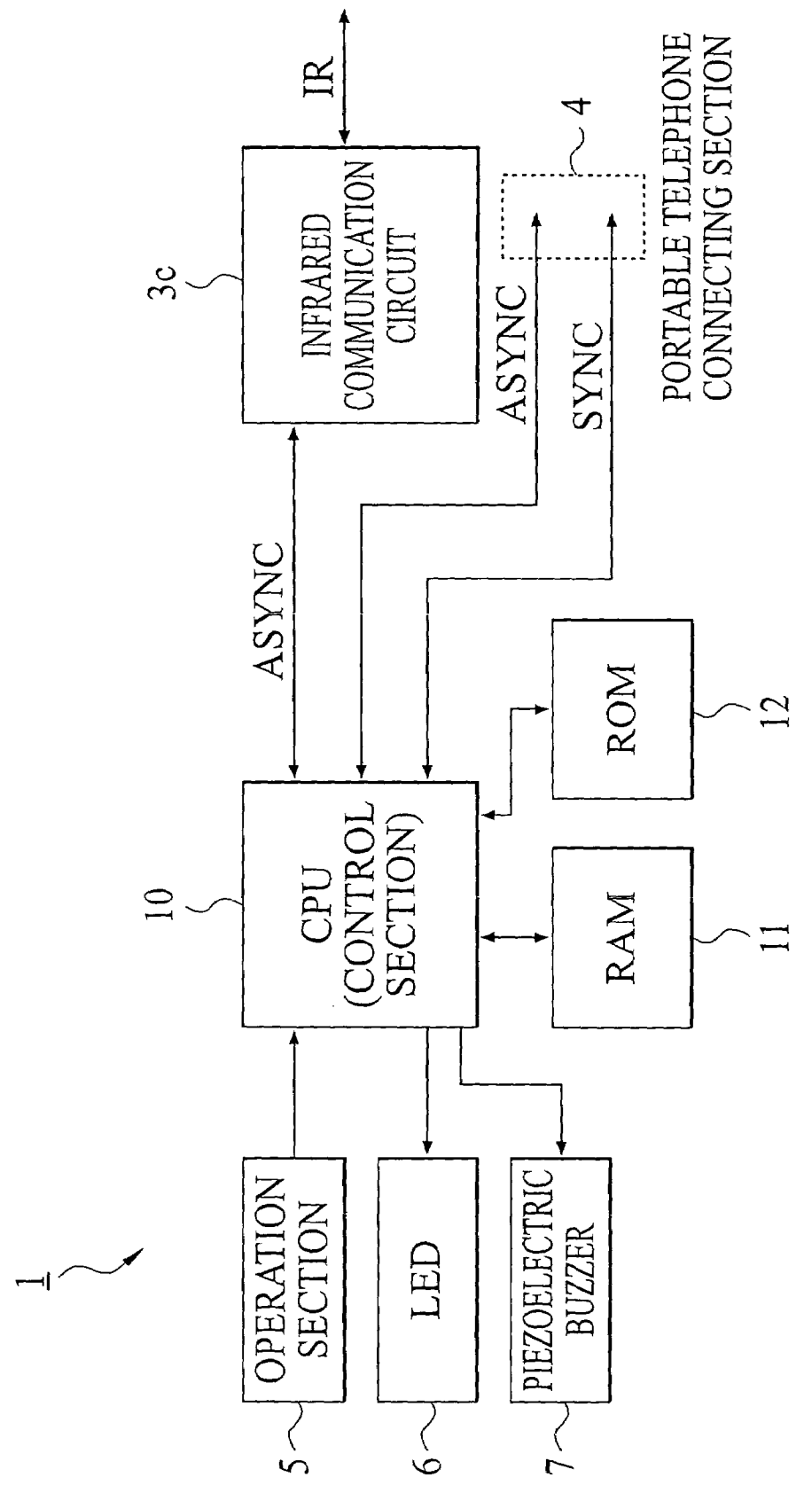
FIG. 2 is a block diagram for showing an inner structure of the infrared communication adapter 1.

FIG. 1 is a plan view for showing an example of an appearance of an infrared communication adapter 1. FIG. 2 is a block diagram for showing an inner structure of the infrared communication adapter 1.

As shown in FIG. 1, the infrared communication adapter 1 comprises a main body case 2 for incorporating a circuit board therein, an infrared communication interface 3 provided on one side surface of the main body case 2, and a portable telephone connecting section 4 which is provided on the other side surface and which is a communication interface to be connected with an external communication interface provided on the portable telephone. On the upper surface of the main body case 2, an operation section 5, an LED (Light Emitting Diode) 6 and an opening 7a for a piezoelectric buzzer are provided. Further, a battery containing section 8 which is not shown in the drawings, is provided on the rear surface of the main body case 2. For example, a lithium battery is contained in the battery containing section 8 as a power supply.

The infrared communication interface 3 includes a light emitting part 3a for emitting the infrared rays to an external equipment 20 (referred to FIGS. 10A and 10B) having an infrared communication interface 21 which is disposed within a predetermined area (for example, a covered distance from a light receiving/emitting part is 20 cm to 100 cm within an angle range of 300°), and a light receiving part 3b for receiving the infrared rays from the external equipment 20. The light emitting part 3a includes a transmitting circuit including an infrared diode therein, and the like, and converts a transmitted data supplied from a CPU 10 (referred to FIG. 2) which will be explained below, into an infrared signal having a predetermined frequency to emit the infrared rays. The light receiving part 3b includes a receiving circuit including an infrared phototransistor therein, and the like, and receives the infrared rays emitted from the infrared communication interface 21 of the external equipment 20 to output the receiving status of the infrared rays to the CPU 10 as a receiving data. In the infrared communication interface 3, the infrared communication between the infrared communication adapter 1 and the external equipment 20, is carried out in accordance with the IrDA standard which is an infrared communication protocol.

The portable telephone connecting section 4 is, for example, a plug for detachably connecting with an external communication interface 31 (referred to FIG. 10B) provided on a PDC (Personal Digital Cellular) type of portable telephone 30. The plug is, for example, a 16 pin interface. The portable telephone connecting section 4 transmits a serial data supplied from the portable telephone 30, to the CPU 10. Further, the portable telephone connecting section 4 transmits a serial data supplied from the CPU 10, to the portable telephone 30. In the portable telephone connecting section 4, the serial data transmission between the infrared communication adapter 1 and the portable telephone 30 is carried out in accordance with a serial data transmission protocol (for example, a protocol defined by a common specification for ARIB STD27 and a digital cellular phone) for carrying out the serial data exchange between the portable telephone 30 and the external equipment 20 through the external communication interface 31.

The operation section 5 is, for example, a push-button type of operating element which is operated by a user in order to input a function selecting command for the infrared communication adapter 1. The operation section 5 outputs a pushing signal corresponding to the pushing operation to the CPU 10.

The LED 6 indicates an operating status of the infrared communication adapter 1 to confirm it visually and emits a light by using a predetermined lighting pattern based on the lighting control signal supplied from the CPU 10.

The piezoelectric buzzer 7 is one for generating an operation confirming sound of the infrared communication adapter 1. The piezoelectric buzzer 7 outputs a predetermined electronic sound in accordance with a sound control signal supplied from the CPU 10 and informs a user of each type of electronic sound in accordance with the contents to be informed by using various patterns.

As shown in FIG. 2, on the circuit board of the infrared communication adapter 1, a micro controller having a CPU (Central Processing Unit) 10, a RAM (Static Random Access Memory) 11 and a ROM (Read Only Memory) 12, an infrared communication circuit (the transmitting circuit and the receiving circuit which are explained above) 3c of the infrared communication interface 3 and the piezoelectric buzzer 7 are mounted. The circuit board is wired so as to connect the infrared communication circuit 3c, the portable telephone connecting section 4, the operation section 5, the LED 6, the RAM 11 and the ROM 12 with the CPU 10.

An asynchronous data transmission path (hereinafter, referred to as "ASYNC") is provided between the CPU 10 and the infrared communication circuit 3c. Two data transmission paths which are an ASYNC and a synchronous data transmission path (hereinafter, referred to as "SYNC") are provided between the CPU 10 and the portable telephone connecting section 4. This structure is one for carrying out the data transmission between each communication interface 3, 4 and the CPU 10 in accordance with each communication protocol. The CPU 10 transmits and receives the control signal with the portable telephone 30 through the ASYNC. Further, the CPU 10 transmits and receives the data itself (a serial data, such as a vCARD, a file data and the like, which will be explained below) to be forwarded through the SYNC.

The CPU 10 carries out a data process for transmitting a data supplied from one communication interface, to the other communication interface between two communication interfaces which are the infrared communication interface 3 and the portable telephone connecting section 4.

Figure 3A:
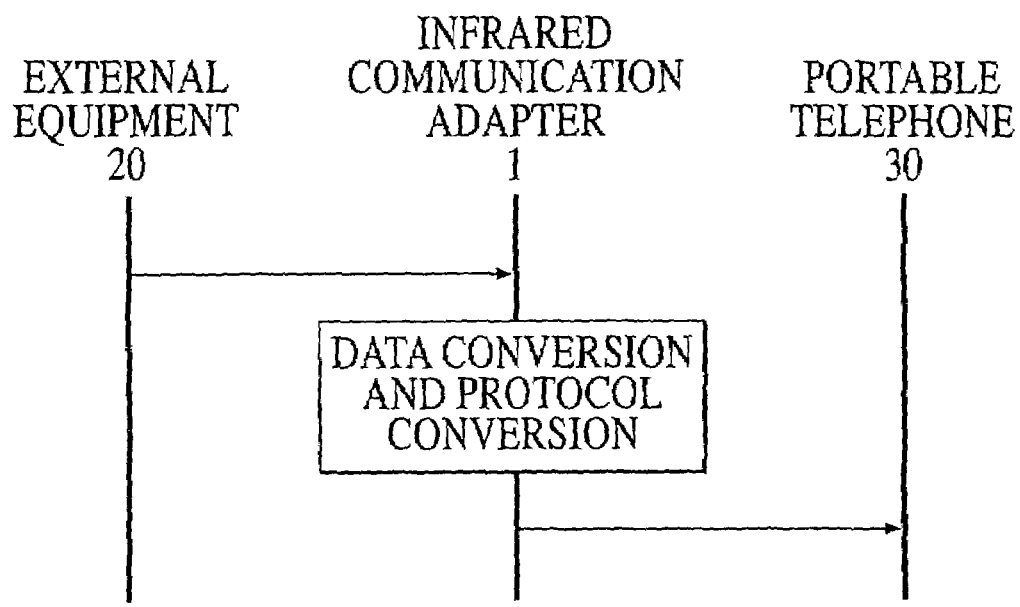
FIGS. 3A and 3B are views for schematically showing each flow of the processes when a data communication is carried out between an external equipment 20 and a portable telephone 30 through the infrared communication adapter 1.
Figure 3B:
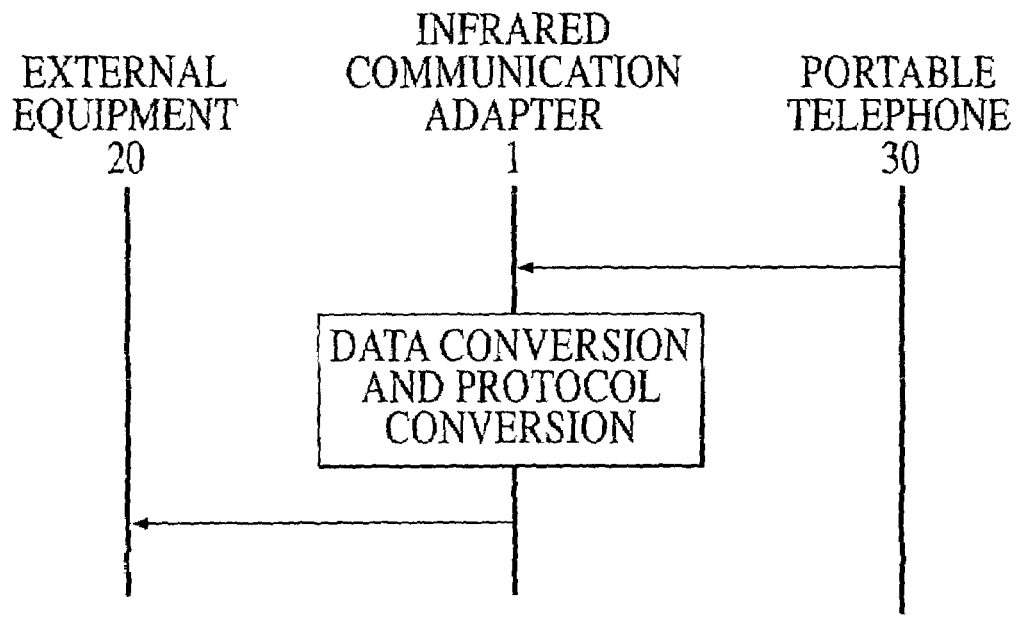
Figure 5A:
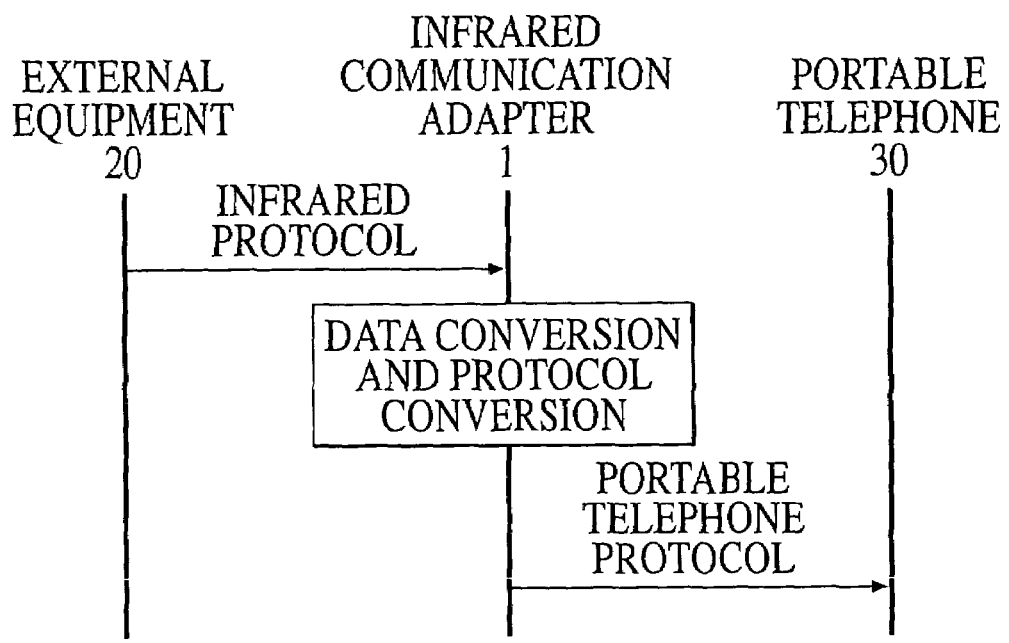
FIGS. 5A and 5B are views for schematically showing each flow of the processes when a data communication is carried out between an external equipment 20 and a portable telephone 30 through the infrared communication adapter 1.
Figure 5B:
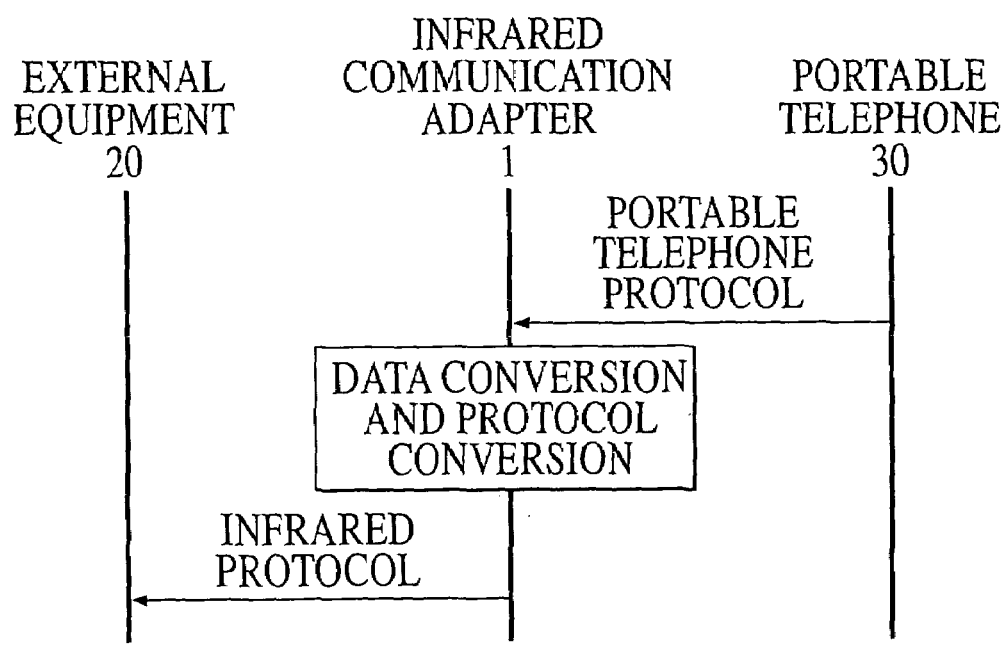

FIGS. 3 and 5 are views for schematically showing each flow of the processes when the data communication is carried out between the external equipment 20 and the portable telephone 30 through the interface communication adapter 1. FIG. 4 is a view for showing an example of a structure of a data (packet) received by each communication interface. FIGS. 3A and 5A show the case that the data transmitted from the external equipment 20 is received to forward it to the portable telephone 30. FIGS. 3B and 5B show the case that the data transmitted from the portable telephone 30 is forwarded to the external equipment 20.

When the data is supplied from one communication interface, the CPU 10 of the infrared communication adapter 1 analyzes the communication protocol of the communication interface which is disposed on the data supply side. The CPU 10 carries out the data processes, such as a protocol conversion process for converting the analyzed communication protocol into the other communication protocol corresponding to the communication interface which is disposed on the data receiving side, and the data conversion process for converting a serial data supplied from the portable telephone 30 into a data which can be transmitted in accordance with the protocol for the infrared communication, to transmit it to the infrared communication interface 3, and for converting a data supplied from the infrared communication interface 3 into a serial data which can be processed by the portable telephone 30, to transmit it to the portable telephone connecting section 4.

For example, in case that the data communication is carried out between the PDC type of portable telephone 30 and the external equipment 20, as shown in FIG. 4A, a DTR (Data Terminal Ready) signal transmitted from a DTE (Data Terminating Equipment; external equipment 20) is stored in a control data segment of the infrared packet P1 received by the infrared communication interface 3. When the data received by the infrared communication interface 3 is forwarded to the portable telephone 30, the CPU 10 generates a status flag segment of the ARIB packet P2 in accordance with the DTR signal and transmits the DTR signal to the portable telephone 30. An informed user data stored in a user data segment of the infrared packet P1 received by the infrared communication interface 3 is stored in a user data segment of the ARIB packet P2 to transmit it to the portable telephone 30.

On the other hand, as shown in FIG. 4B, a DSR (Data Set Ready) signal transmitted from a DCE (Data Circuit Equipment) and a CD (Carry Detect) signal are stored in a status flag segment of the ARIB packet P2 received by the portable telephone connecting section 4. When the data received by the portable telephone connecting section 4 is forwarded to the external equipment 20 (infrared side), the CPU 10 generates a control data segment of the infrared packet P1 in accordance with each signal and transmits each signal to the infrared side. An informed user data stored in a user data segment of the ARIB packet P2 received from the portable telephone connecting section 4 is stored in a user data segment of the infrared packet P1 to transmit it to the infrared side.

In case that the received data is supplied from the external equipment 20 through the infrared communication interface 21 by carrying out the protocol conversion process and the data conversion process, the infrared communication protocol is analyzed and the received data is converted into a data which can be processed by the portable telephone 30, to transmit it to the portable telephone connecting section 4 (referred to FIG. 5A). In case that the data is supplied from the portable telephone 30 connected with the portable telephone connecting section 4, the communication protocol of the portable telephone 30 is analyzed and the data is converted into a data form which is adapted to the infrared communication interface 3, to transmit it to the infrared communication interface 3 as a transmitted data (referred to FIG. 5B). That is, in the infrared communication adapter 1, the serial interface (RS232C) emulation between the portable telephone 30 and the external equipment 20 is realized.

Further, the infrared communication adapter 1 carries out a process for realizing plural different data exchanging functions (for example, a local data exchanging function and a portable telephone modem adapter function, which will be explained below) by using a single infrared communication port.

Figure 6:
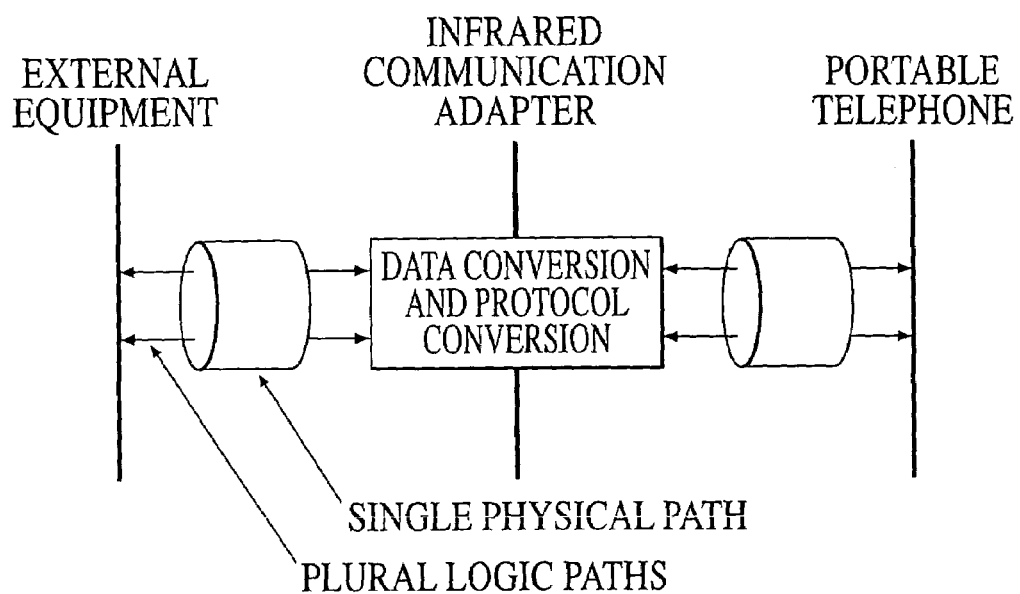
FIG. 6 is a schematic view for explaining a process for realizing plural different data exchanging functions by using a single infrared communication port.
Figure 7:
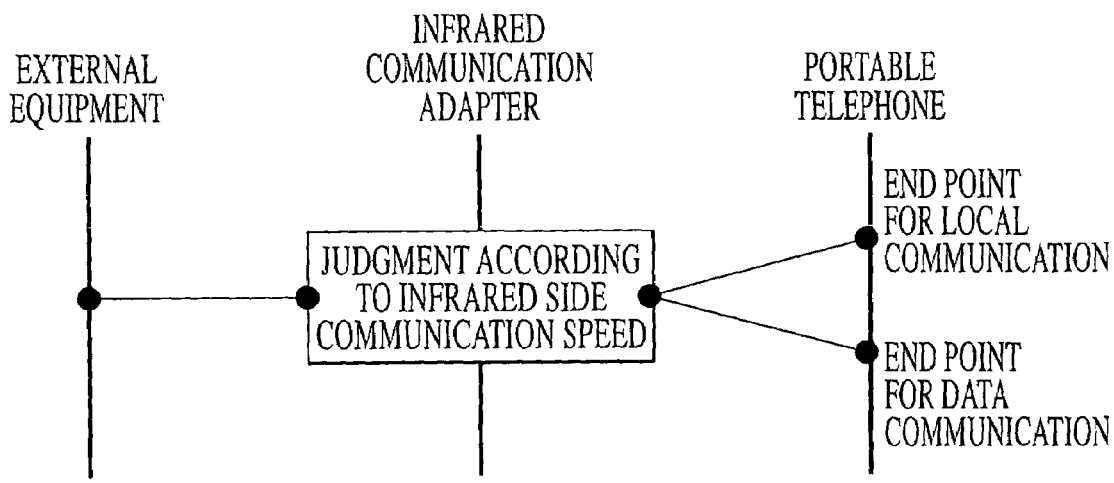
FIG. 7 is a view for explaining the switching of a logic path in accordance with a communication speed.

FIG. 6 is a schematic view for explaining the process for realizing plural different data exchanging functions by using a single infrared communication port. FIG. 7 is a view for explaining the switching of the logic path in accordance with the communication speed.

As shown in FIGS. 6 and 7, plural logic serial data paths (hereinafter, referred to as "virtual serial data path") are formed by a single physical path between the infrared communication adapter 1 and the external equipment 20. The virtual serial data path to be used is specified in accordance with the data communication speed between the external equipment 20 (Terminal Equipment; hereinafter, referred to as "TE") and the portable telephone 30 (Mobile Equipment; hereinafter, ref erred to as "ME") to which the infrared communication adapter 1 is attached.

In the IrDA standard, the transmitting side terminal and the receiving side terminal have a function for informing each other of the communication speed when the infrared communication port is connected. By using this informing function, the CPU 10 detects the data communication speed between TE and ME and specifies the virtual serial data path to be used in accordance with the detected data communication speed. When the informed transmission speed is not less than 2400 bps, it is judged that the portable telephone modem adapter function is used. Then, the virtual serial data path is switched to a wireless modem side (end point for data communication; referred to FIG. 7). When the informed transmission speed is 600 bps, it is judged that the local data exchanging function is used. Then, the virtual serial data path is switched to a local signal side (end point for local communication; referred to FIG. 7).

When the CPU 10 carries out each function, it is judged whether the portable telephone connecting section 4 is connected with the portable telephone 30. The CPU 10 judges the operating state of the operation section 5 and controls the operation so as to carry out another process in accordance with the judging result.

In this embodiment, the operation section 5 includes one push-button type of operating element. Various functions are carried out in accordance with the operating state thereof.

FIGS. 8A and 8B are views for showing the correlation between a button operation and the function to be carried out.

FIG. 8A shows an example of the correlation between a button pushing state (operating state) and a function to be carried out in case that the infrared communication adapter 1 is used alone (in the state that the adapter 1 is not attached to the portable telephone 30).

An electronic visiting card transmitting function is carried out by "one push". A file receiving function is carried out by "push for 2 seconds". An electronic visiting card receiving function is carried out by "push for 5 seconds". A file transmitting function is carried out by "double click".

FIG. 8B shows a table for showing an example of the correlation between a button pushing state (operating state) and a function to be carried out in case that the infrared communication adapter 1 is used in a state that the adapter 1 is adapted to the portable telephone 30.

A telephone number transmitting function of the portable telephone 30 is carried out by "onepush". A password registering function for registering a password to the infrared communication adapter 1 is carried out by "push for 5 seconds".

The RAM 11 includes an electronic visiting card data storing area for storing plural electronic visiting card data including user's electronic visiting card, a password data storing area for storing a password data, a file data storing area for storing a file data received from the external equipment 20, a work memory and the like. In this case, the electronic visiting card is one including a name data, a telephone number data, an address data or the like. For example, it is desirable that the electronic visiting card is adapted to a standard relating to an electronic visiting card which is called vCARD.

The ROM 12 stores a basic program for controlling the operation of the infrared communication adapter 1, a controlling program for controlling each function, each type of data and the like. The CPU 10 carries out the data process in accordance with each program and data.

Figure 9:
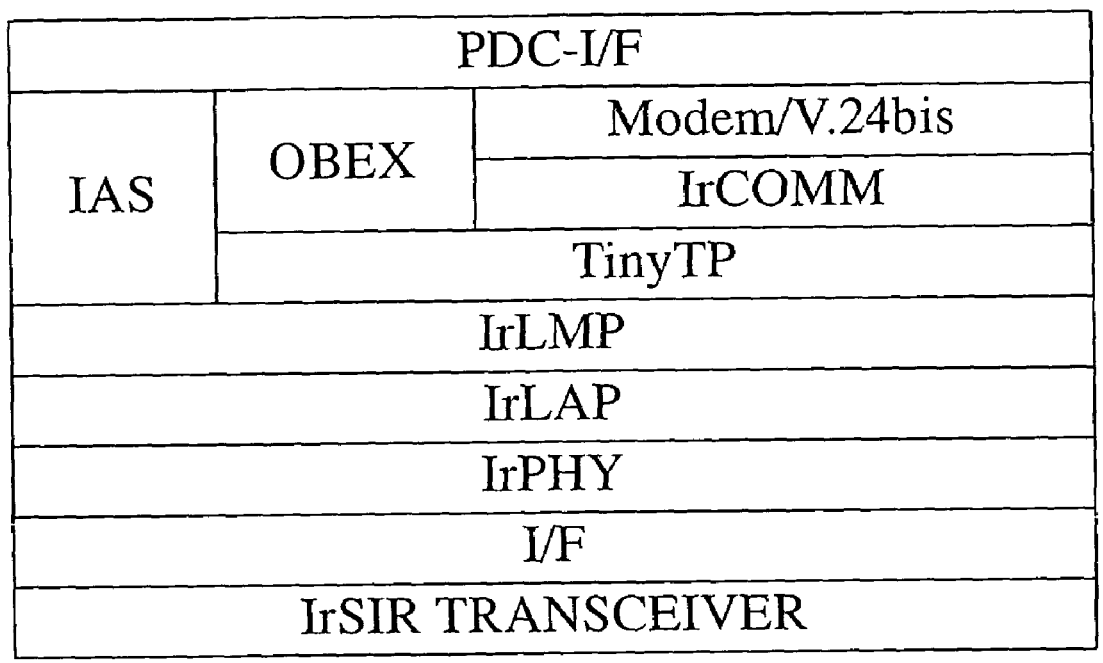
FIG. 9 is a view for showing a protocol stack structure of the infrared communication adapter 1.

FIG. 9 is a view for showing a protocol stack structure of the infrared communication adapter 1.

As shown in FIG. 9, in order to realize each type of data exchanging function based on the IrDA standard, a transceiver (transmitting/receiving circuit) based on the IrSIR (IrDA Serial Infrared Standard) is used as an infrared communication interface (I/F). Further, the IrPHY (IrDA Physical Layer) defining a modulation system, a signal strength, a directivity and the like, is used. The IrLAP (IrDA Link Access protocol) defining an error controlling function, a transparency and a flow control which are based on a general HDLC (Highlevel Data Link Control), a function for negotiating the communication speed and the maximum data size prior to the communication and a process for searching and detecting an unspecified external equipment to be connected, is used. The IrLMP (IrDA Link Management protocol) for providing a function of multiplexing/demultiplexing corresponding to a port number used in TCP and UDP of the TCP/IP protocol, is used. The TinyTP (Transport Protocol) for carrying out the flow control in each logic link, is used. As an application protocol, the OBEX for a general data object exchange, the IrCOMM for simulating a R5232C cable connection, and the Modem/V.42bis having a wireless modem function are provided.

The infrared communication adapter 1 having the above structure provides various data exchanging functions according to the using state.

Firstly, the using state of the infrared communication adapter 1 will be explained with reference to FIGS. 10A and 10B.

Figure 10A:
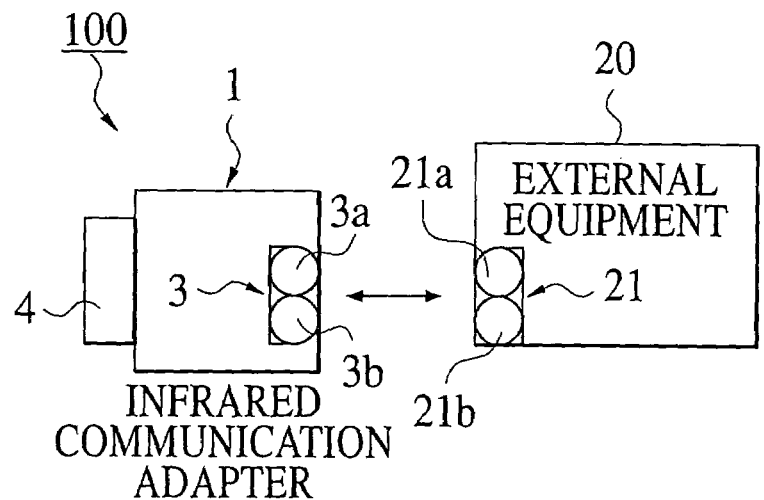
FIGS. 10A and 10B are views for showing each using mode of the infrared communication adapter 1.

FIG. 10A is a view for showing the first infrared communication system 100 using the infrared communication adapter 1. In the first infrared communication system 100, the infrared communication adapter 1 is faced to the infrared communication interface 21 (including the light emitting part 21a and the light receiving part 21b) of the external equipment 20 alone to carry out the data exchange by using the infrared rays through the infrared communication interfaces 3 and 21.

In the specification, the external equipment 20 is a personal computer, a PDA, a portable telephone and the like, which have an infrared communication function based on the IrDA standard.

For example, in case that an electronic visiting card data is previously registered to the infrared communication adapter 1, an electronic visiting card can be easily transmitted to partner's PDA or the like when the visiting cards are exchanged.

Figure 10B:
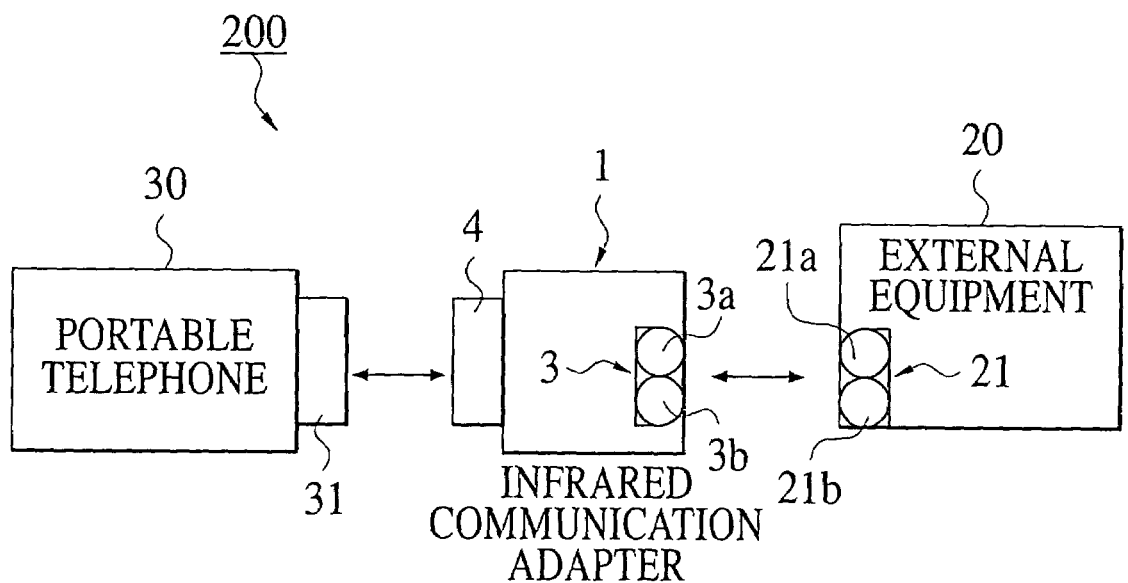

FIG. 10B is a view for showing the second infrared communication system 200 using the infrared communication adapter 1. In the second infrared communication system 200, the portable telephone connecting section 4 of the infrared communication adapter 1 is attached to the external communication interface 31 of the portable telephone 30 (FIG. 10 shows the state that the connecting section is not attached to the interface.). Further, the infrared communication adapter 1 is faced to the infrared communication interface 21 of the external equipment 20 in order to carry out the data process to exchange the data by using the infrared rays between the portable telephone 30 and the external equipment 20.

Next, each function of the infrared communication adapter 1 will be explained.

The infrared communication adapter 1 carries out each type of data exchanging function by using the infrared rays in a state that the portable telephone 30 is connected with the adapter or a state that the portable telephone 30 is not connected with the adapter. The data exchanging functions are roughly divided into two functions. One is a local data exchanging function for exchanging a telephone number data and an electronic visiting card by using the infrared rays. The other is a portable telephone modem adapter function using the infrared rays.

In the local data exchanging function, a vCARD (a standard of an electronic visiting card; hereinafter, the electronic visiting card is referred to as vCARD.) stored in the RAM 11 of the infrared communication adapter 1, is exchanged with the external equipment 20 having an infrared communication function based on the IrDA/IrMC standard, in accordance with the OBEX system which is a data exchanging protocol. When the portable telephone connecting section 4 of the infrared communication adapter 1 is connected with the portable telephone 30, a call number data which is user's telephone number of the portable telephone 30, is converted into the portable telephone 30 to transmit it to the external equipment 20 by using the infrared rays through the infrared communication interface 3. When the vCARD is received from the external equipment 20, a data (for example, a telephone number data or the like) which can be registered to the portable telephone 30, is extracted from the vCARD to register it to a telephone directory (memory) of the portable telephone 30. Further, a process for editing memorized contents of the portable telephone 30 by using a memory editor application provided in the external equipment 20, or the like is included in the local data exchange.

The portable telephone modem adapter function is a modem function using an infrared virtual serial data path (IrCOMM).

In a state that the infrared communication adapter 1 is connected with the portable telephone 30, a high speed data communication modem function of the portable telephone 30, which is based on the ARIB-STD-27 is used through the infrared communication interface 21. When the portable telephone modem adapter function is used, it is possible to carry out a dial up connection with the Internet by using the infrared rays from the external equipment 20, to browse a home page by using a WEB browser stored in the external equipment 20 and to use an application, such as an Internet mail or the like.

Further, in a state that the infrared communication adapter 1 is connected with the portable telephone 30, the infrared communication adapter 1 has a function for registering a password to the RAM 11. In this case, a registerable password is the same as one registered to the connected portable telephone 30. When the infrared communication adapter 1 is connected with the portable telephone 30 having a password which is not coincident with one registered to the adapter, it is prohibited that the vCARD received from the external equipment 20 is registered to the portable telephone 30.

Next, the operations will be explained.

Figure 11:
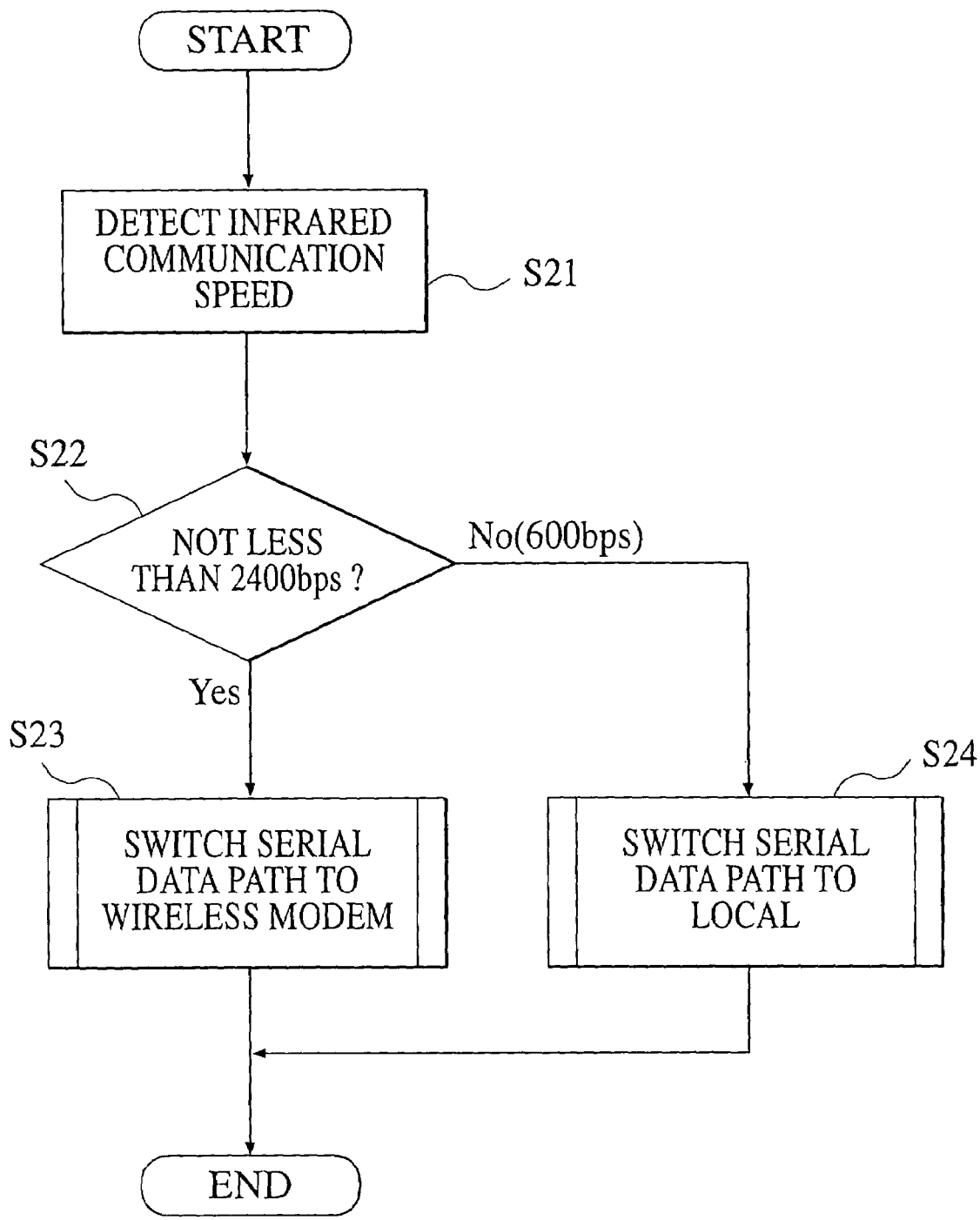
FIG. 11 is a flowchart for explaining the virtual serial data path switching process carried out by the CPU 10 of the infrared communication adapter 1.
Figure 12:
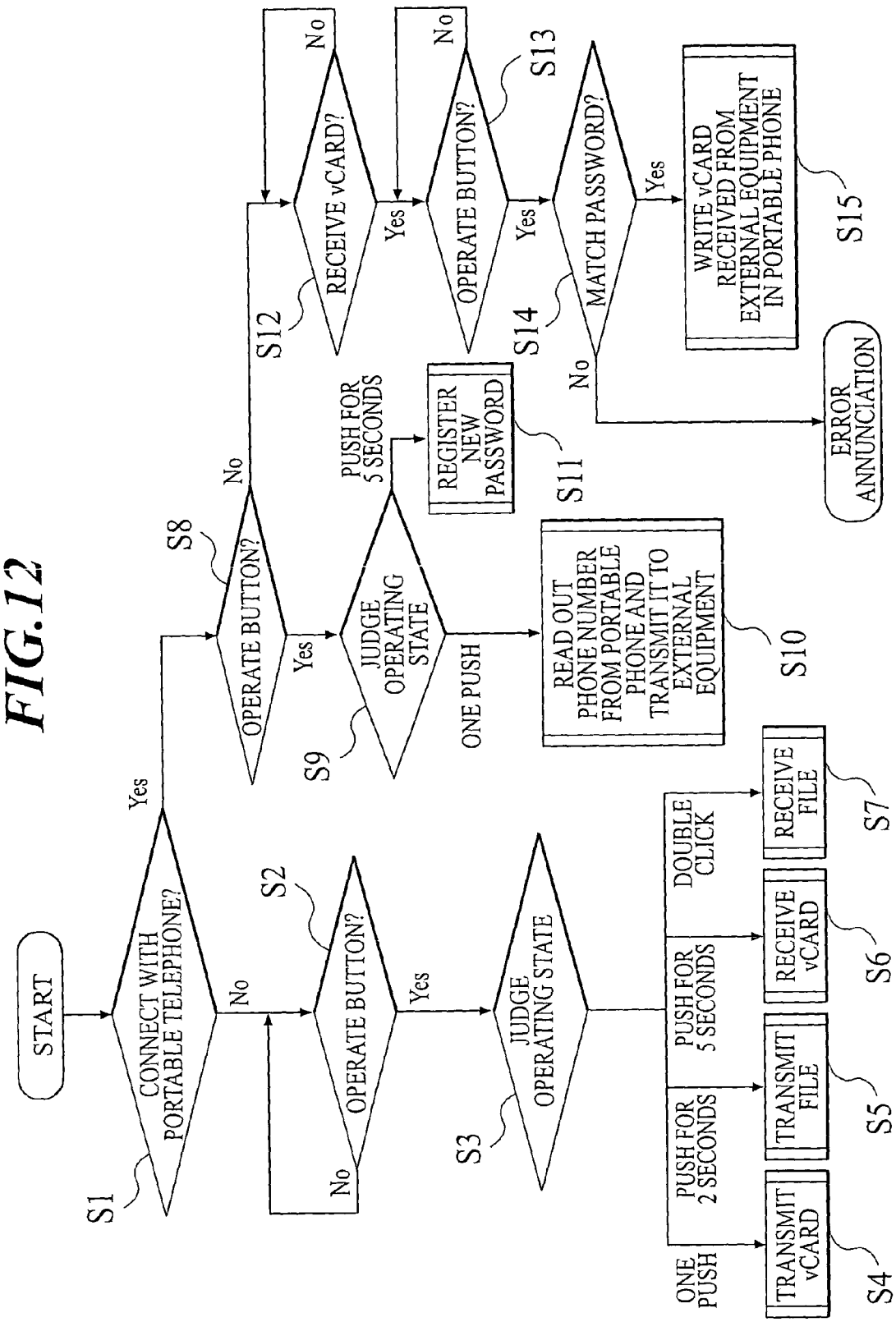
FIG. 12 is a flowchart for showing an example of the operational control corresponding to the operating state of the operation section, which is carried out by the CPU 10 of the infrared communication adapter 1.

FIG. 11 is a flowchart for explaining the virtual serial data path switching process carried out by the CPU 10 of the infrared communication adapter 1. FIG. 12 is a flowchart for explaining the operational control which is carried out by the CPU 10 of the infrared communication adapter 1. FIGS. 13 to 16 are views for schematically showing each operational sequence.

Each process described in these flowcharts is stored in the ROM 12 in a form of the program code. The CPU 10 carries out the process in accordance with the programs.

Firstly, the operational control for automatically selecting that the portable telephone modem adapter function is used or that the local data exchanging function is used in plural data exchanging functions provided in the infrared communication adapter 1, is explained with reference to the flowchart of FIG. 11.

The infrared communication adapter 1 is attached to the portable telephone 30 and is disposed within an area that the infrared communication can be carried out with the external equipment 20.

When the adapter is connected with the external equipment 20 through the infrared communication, the CPU 10 detects the data communication speed between TE and ME, which is reported from the external equipment 20 (Step S21). The CPU 10 judges whether the informed data communication speed is not less than 2400 bps (Step S22). When the informed data communication speed is not less than 2400 bps (Step S22; Yes), the virtual serial data path is switched to the wireless modem side (Step S23). For example, when the informed data communication speed is 600 bps (Step S22; No), the virtual serial data path is switched to the local signal side (Step S24).

Next, the operational control corresponding to the operating state by the operation section 5 will be explained with reference to FIGS. 12 to 16.

As shown in FIG. 12, the CPU 10 judges whether the portable telephone connecting section 4 is connected with the portable telephone 30 (Step S1). When the portable telephone connecting section 4 is not connected with the portable telephone 30 (Step S4), the CPU 10 waits for the pushing signal to be supplied from the operation section 5. When the pushing signal is detected (Step S2), the operating state of the operation section 5 is judged (Step S3). In this case, when a "button one push" operation is carried out by the operation section 5, the vCARD transmitting process is started.

In the vCARD transmitting process, as shown in FIG. 13, the CPU 10 reads out the vCARD stored in the RAM 11 and transmits the vCARD to the external equipment 20 through the infrared communication interface 3 by using the IrOBEX system (Step S4).

When a "push for 2 seconds" operation is carried out by the operation section 5, the file receiving process is started. In the file receiving process, when the file data, such as a document data, an image data or the like, is received through the infrared communication interface 3, the file data is stored in the RAM 11 (Step S5).

When a "push for 5 seconds" operation is carried out by the operation section 5, the vCARD receiving process shown in FIG. 14 is started. In the vCARD receiving process, when the vCARD is received through the infrared communication interface 3 by using the IrOBEX system, the CPU 10 stores the vCARD in the RAM 11 (Step S6).

When a "double click" operation is carried out, the file transmitting process is started. In the file transmitting process, the CPU 10 reads out the file data stored in the RAM 11 and transmits the file data to the external equipment 20 through the infrared communication interface 3 (Step S7).

In Step S1, when it is judged that the portable telephone connecting section 4 is connected with the portable telephone 30 (Step S1; Yes), the CPU 10 waits for the button operation of the operation section 5. When the button operation is carried out, the operating state thereof is judged (Step S8, Step S9).

Figure 15:
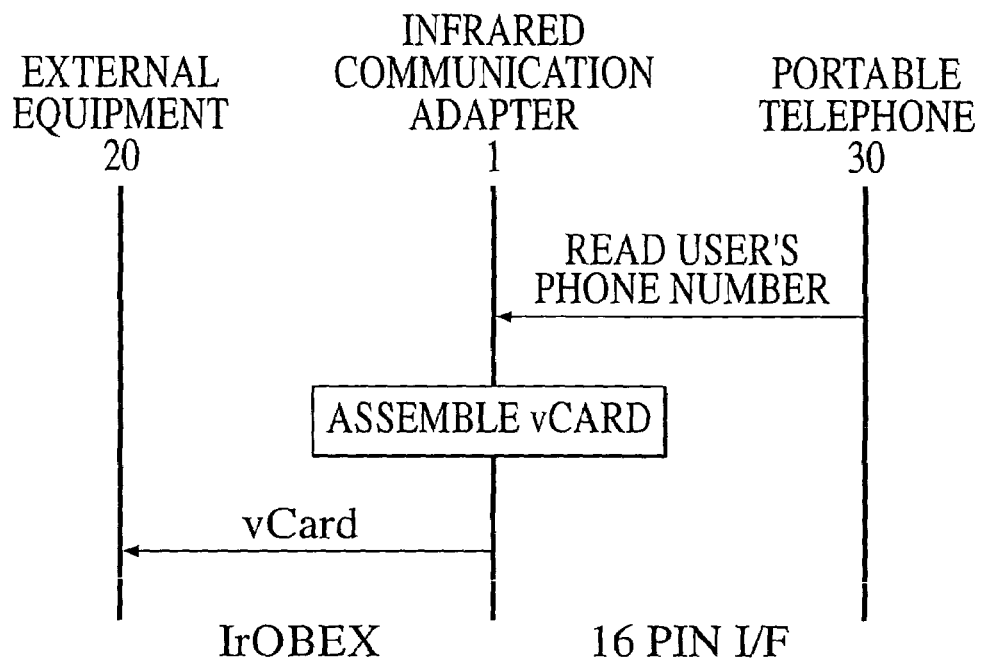
FIG. 15 is a view for schematically showing the operational sequence of the process for reading a call number of the portable telephone from the connected portable telephone and for transmitting it to an external equipment by using the infrared rays.

When the "one push" operation is carried out, as shown in FIG. 15, the CPU 10 reads user's telephone number data (call number data) from the portable telephone 30 connected with the portable telephone connecting section 4 in a serial data form. The read call number data is arranged in a vCARD form. The vCARD is transmitted to the external equipment 20 through the infrared communication interface 3 by using the IrOBEX system (Step S10).

When the "push for 5 seconds" is carried out, the password registering process is started. In the password registering process, the CPU 10 reads the numerical data inputted by the numerical key operation of the portable telephone 30 and registers the numerical data to the RAM 11 (Step S11).

Figure 16:
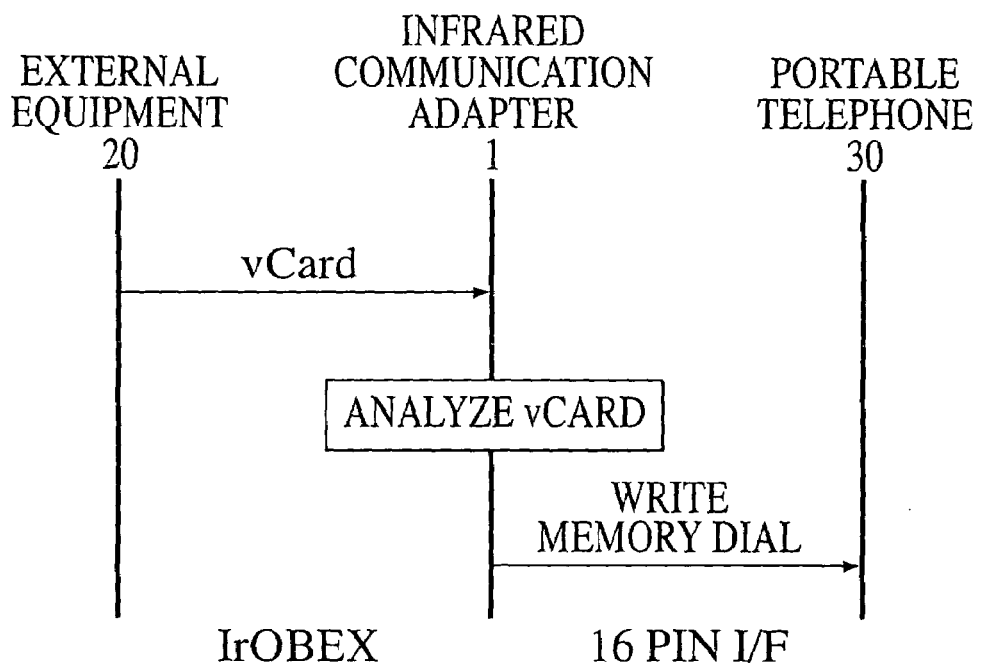
FIG. 16 is a view for schematically showing the operational sequence of the process for reading a telephone number from the vCARD transmitted from the external equipment and for registering it to a memory of the portable telephone.

When the vCARD is received from the external equipment 20 in a state that the portable telephone 30 is connected (Step S1; Yes→Step S8; NO→Step S12; Yes), the received vCARD is stored in a work memory. The piezoelectric buzzer 7 is actuated to output a sound in a predetermined pattern. A user is informed that the vCARD is received. Then, when the button operation is carried out by the operation section 5 (Step S13; Yes), the CPU 10 judges whether the password stored in the RAM 11 of the infrared communication adapter 1 is coincident with the password registered to the portable telephone 30. When two passwords are coincident with each other (Step S14; Yes), the vCARD stored in the work memory is analyzed to extract the telephone number data. The telephone number data is transmitted to the portable telephone 30 through the portable telephone connecting section 4 to register it to the memory of the portable telephone 30 (Step S15; FIG. 16).

As explained above, the infrared communication adapter 1, includes: the portable telephone connecting section 4 for carrying out a serial data transmission by connecting with the external communication interface 31 provided in the portable telephone 30, in accordance with a serial data transmission protocol of the portable telephone 30; the infrared communication interface 3 for carrying out a data communication with the external equipment 20 having the infrared communication interface 21 in accordance with the IrDA standard; and the CPU 10 for carrying out a data process to carry out each type of data exchanging process between the communication interfaces 3 and 4. That is, in order to transmit the data supplied from one communication interface to the other communication interface, the CPU 10 carries out a protocol conversion process for analyzing a communication protocol of the communication interface disposed on the data supply side to convert the analyzed communication protocol into a communication protocol corresponding to a communication interface disposed on the data receiving side; and a data conversion process for converting a serial data supplied from the portable telephone connecting section 4, into a data which can be transmitted in accordance with a protocol based on the IrDA standard, to transmit the data to the infrared communication interface 3, and for converting a data supplied from the infrared communication interface 3, into a serial data which can be processed by the portable telephone 30, to transmit the serial data to the portable telephone connecting section 4.

Therefore, when the infrared communication adapter 1 is attached to the portable telephone 30 which does not have an infrared communication function, it is possible to carry out the data exchange with the external equipment 20 having an infrared communication function by using the infrared rays.

The infrared communication adapter 1 has plural serial data exchanging functions between the portable telephone 30 and the external equipment 20, such as a portable telephone wireless modem adapter function for carrying out a serial data exchange by a wireless modem when the adapter is attached to the external communication interface 31 of the portable telephone 30, a serial data exchanging function for a local process of the portable telephone 30, and the like. A single infrared communication interface 3 is used as plural virtual serial data paths corresponding to each function. The CPU 10 detects the data communication speed between TE and ME, which is reported when the external equipment 20 is connected by the infrared rays. In accordance with the detected data communication speed, the CPU 10 selects one state from a state that the virtual serial data path is connected with a wireless modem and a state that the virtual serial data path is connected with a local signal.

Therefore, it is possible to realize plural serial data exchanging functions on a single infrared port. Because the function to be used is automatically selected without carrying out a special operation when the adapter is connected, it is possible to improve the convenience.

Because the operation section 5 and the RAM 11 are provided in the infrared communication adapter 1, some kind of data which is received from the external equipment 20 can be directly stored. Then, the stored data can be read out by the operation section 5 to transmit the data to the external equipment 20 by using the infrared rays. That is, even though the infrared communication adapter 1 is not connected with the portable telephone 30, it is possible to carry out the data exchange with the external equipment and to improve the convenience.

Further, in a state that the adapter is connected with the portable telephone 30, it is possible to easily carry out the exchange of the portable telephone number or the exchange of the electronic visiting card with partner's external equipment 20 by a simple operation.

Because a different function can be carried out in accordance with the connecting state of the portable telephone and the operating state of the operation section having one operating element, it is possible to simplify the structure of the operation section and to provide a useful infrared communication adapter 1.

In the present embodiment, the infrared communication adapter 1 is connected with a PDC type of portable telephone 30. However, the present invention is not limited to this. A CDMA (Code Division Multiple Access) type, a GSM (Global System for Mobile Communication) type or other types of portable telephone can be used. In this case, the portable telephone connecting section 4 has a structure which is adapted to the external communication interface of the portable telephone. Further, in the present embodiments the operation section 5 is constructed by one push-button type of operating element. However, the present invention is not limited to this. A concrete shape or an operation state of the operation section may be modified without departing from the gist of the present invention.

According to the infrared communication adapter of the present invention, because the adapter includes the portable telephone side communication interface, the infrared communication interface and the data processing section, it is possible to carry out the data communication with the external equipment having an infrared communication interface by attaching the infrared communication adapter, even though the portable telephone does not have an infrared communication function.

The invention claimed is:

1. An infrared communication adapter, comprising:
   a portable telephone side communication interface for carrying out a serial data transmission by connecting with an external communication interface provided in a portable telephone, in accordance with a serial data transmission protocol of the portable telephone;
   an infrared communication interface for carrying out a data communication with an external equipment having an infrared communication interface in accordance with an infrared communication protocol;
   a data processing section for carrying out a data process to transmit a data supplied from one communication interface of the communication interfaces, to another of the communication interfaces;
   wherein the data processing section includes--
   a protocol conversion unit for analyzing a communication protocol of a data supplying side communication interface and for converting the analyzed communication protocol into a communication protocol corresponding to a data receiving side communication interface, and
   a data conversion unit for converting a serial data supplied from the portable telephone side communication interface, into a data which can be transmitted in accordance with the infrared communication protocol, to transmit the data to the infrared communication interface, and for converting a data supplied from the infrared communication interface, into a serial data which can be processed by the portable telephone, to transmit the serial data to the portable telephone side communication interface;

a storing section for storing a data; and an operation section for being operated by a user, wherein the data processing section includes-- a first judging unit for judging whether the portable telephone is connected to the adapter or not, a second judging unit for judging an operating state in accordance with an operation time or the number of operations of the operation section, and a control section for controlling the adapter so as to carry out one process selected from a first process for reading a data from the storing section in accordance with each judging result of the first and second judging units to transmit the read data to the external equipment through the infrared communication interface, a second process for receiving the transmitted data from the external equipment through the infrared communication interface to store the received data in the storing unit, a third process for reading a call number data registered to the connected portable telephone, to transmit the read call number data to the external equipment through the infrared communication interface as an electronic visiting card data, and a fourth process for receiving the electronic visiting card data for the external equipment through the infrared communication interface and extracting a data which can be registered to the portable telephone, from the electronic visiting card data, to register the extracted data to the portable telephone.

2. The infrared communication adapter as claimed in claim 1, wherein the data processing section further comprises:

an electronic visiting card exchanging unit for reading the call number data from the portable telephone connected with the portable telephone side communication interface.

3. The infrared communication adapter as claimed in claim 1, wherein the data processing section further comprises:

a data storing control unit for storing a received data when the received data is received from the external equipment through the infrared communication interface in a state that the portable telephone is not connected.

4. The infrared communication adapter as claimed in claim 1, wherein, in order to carry out plural different serial data exchanging processes between the portable telephone and the external equipment, plural serial data paths corresponding to each serial data exchanging process are virtually generated, and wherein the infrared communication adapter includes a detecting section for detecting a data communication speed between the external equipment and the infrared communication adapter, and a specifying section for specifying a serial data path to be used among the plural serial data paths in accordance with a detecting result of the detecting section.

5. The infrared communication adapter as claimed in claim 4, wherein the plural serial data exchanging processes includes a local serial data exchanging process between the portable telephone and the external equipment, and a modem connecting process for using a modem function provided in the portable telephone.

* * * * *